United States Patent [19] [11] 3,995,604
Brandstetter [45] Dec. 7, 1976

[54] SPARK IGNITED INTERNAL COMBUSTION ENGINE OPERATED WITH CHARGE STRATIFICATION
[75] Inventor: Walter Brandstetter, Gifhorn, Germany
[73] Assignee: Volkswagenwerk Aktiengesellschaft, Wolfsburg, Germany
[22] Filed: Feb. 25, 1975
[21] Appl. No.: 553,034
[30] Foreign Application Priority Data
Mar. 7, 1974 Germany ............................ 2410803
[52] U.S. Cl. .......................... 123/75 B; 123/179 G; 123/32 SP; 123/32 ST; 123/136
[51] Int. Cl.² ..................... F02B 19/10; F02B 19/18
[58] Field of Search .......... 123/32 SP, 32 ST, 75 B, 123/191 S, 191 SP, 143 B, 136, 127

[56] References Cited
UNITED STATES PATENTS

| 1,181,122 | 5/1916 | Eastman | 123/143 B |
| 1,957,541 | 5/1934 | Johnson | 123/32 SP |
| 3,656,463 | 4/1972 | Kranc | 123/136 |
| 3,799,140 | 3/1974 | Vogelsang | 123/32 SP |
| 3,890,942 | 6/1975 | Date | 123/32 SP |

FOREIGN PATENTS OR APPLICATIONS
2,333,234 6/1973 Germany ........................ 123/136

Primary Examiner—Charles J. Myhre
Assistant Examiner—Ronald B. Cox
Attorney, Agent, or Firm—Brumbaugh, Graves, Donohue & Raymond

[57] ABSTRACT

An internal combustion engine of the type operated with charge stratification is disclosed. The engine comprises a main combustion chamber and an auxiliary combustion chamber (prechamber), the main chamber and prechamber being interconnected by a short passage. The engine is supplied with fuel from a closed fuel system having a filter for adsorption of gaseous fuel components. An auxiliary intake line connects the prechamber with the adsorption filter such that the filter operates in the desorption direction as gases are drawn into the prechamber from the filter.

7 Claims, 2 Drawing Figures

SPARK IGNITED INTERNAL COMBUSTION ENGINE OPERATED WITH CHARGE STRATIFICATION

BACKGROUND OF THE INVENTION

The present invention concerns a spark ignited internal combustion engine operated with charge stratification having a main combustion chamber and an auxiliary combustion chamber, or "prechamber", connected to the main chamber by means of a short passage. The auxiliary combustion chamber is provided with a fuel delivery device as well as a device for igniting a combustable fuel-air mixture which is richer than the main combustion charge.

Spark ignited internal combustion engines of the type operated with stratified charges have been known for many years. Although many variants on this engine design have been developed, the basic idea of all stratified charge engines has been, through structural measures, to diversify the mixture composition of the cylinder charge, at the instant of ignition, in such a manner that an ignitable fuel-rich mixture is present in the immediate vicinity of the spark plug while the charge in the remaining combustion space is properly matched to the prevailing operating conditions of the engine. This latter combustion charge may therefore consist of a lean mixture or even of air.

While heretofore such engine designs have been aimed at ensuring the safe ignition of the cylinder charge, notwithstanding wide variations in the total mixture composition and/or permitting carburetor-fueled operation at higher compression ratios without reaching the knock limit, the stratified-charge method is viewed today primarily as a possible route to the reduction of noxious substances contained in the engine emissions.

In the known designs of internal combustion engines operated with mixture stratification, the combustion chamber is divided into a main combustion chamber, delimited by the piston, and an auxiliary or prechamber in communication with the main chamber. The prechamber is provided with an ignition device, such as a spark plug, and a fuel delivery device consisting either of a fuel injection nozzle or an intake valve for delivery of a fuel-rich mixture. The prechamber is connected with the main combustion chamber by a short passage so that, following ignition of the fuel-rich charge portion present in the prechamber, the flame front can advance into the main combustion chamber for the purpose of igniting of the main charge, which may be made much leaner than the charge in the prechamber in dependence upon the engine load.

Difficulties have been encountered in internal combustion engines of the above-described type, particularly when cold starting and during the warm-up phase. The fuel of the comparatively rich mixture present in the prechamber has a tendency to condense heavily on the cold chamber walls making it necessary, under these operating conditions, to supply an especially large quantity of fuel which can then be only imperfectly combusted.

SUMMARY OF THE INVENTION

It is an object of the present invention to provide a spark ignited internal combustion engine, of the type operating with charge stratification, which avoids the difficulties and disadvantages of the prior art engines noted above.

This object, as well as other objects which will become apparent in the discussion that follows, are achieved, according to the present invention, by providing the internal combustion engine with an auxiliary intake line interconnecting the auxiliary chamber and a fuel adsorption filter such that the filter operates in the desorption direction as gases are drawn into the auxiliary chamber.

The fuel adsorption filter referred to above is already well known and is conventionally employed with internal combustion engines for the purpose of adsorbing gaseous components formed in a closed fuel system; i.e., in the fuel tank and possibly also the float chamber of the carburetor. By connecting this otherwise standard filter device via an auxiliary intake line to the auxiliary chamber in the manner described above, the low-boiling fuel components adsorbed in the filter pass into the auxiliary chamber during the intake stroke and procure a better and easier ignition of the fuel-air mixture.

Suitably, the auxiliary intake line is associated with an automatically controlled auxiliary intake valve, such as a conventional check valve. This valve does not require any additional control mechanism because its closing spring may be designed to allow the valve to automatically open under the negative pressure occurring during the intake stroke, and to close at the end of the intake stroke by the rising pressure in the auxiliary chamber.

An auxiliary intake valve of this kind is employed to special advantage in an internal combustion engine wherein the fuel delivery means comprises a fuel injection nozzle that opens into the auxiliary chamber. In this case, the auxiliary intake valve serves to scavenge the exhaust gas residue in the auxiliary chamber produced during combustion.

In internal combustion engines having a valveless auxiliary chamber receiving fuel through an injection nozzle, it has been found that in the partial-load range or when the engine is operated at high throttle, a large amount of exhaust gas residue remains in the auxiliary chamber, unfavorably influencing subsequent combustion. This condition is remedied by the auxiliary intake valve controlling the auxiliary intake line in accordance with the present invention. This valve, through its automatic and precisely adjusted opening during the intake stroke, scavenges the auxiliary chamber until the desired exhaust gas residue share is attained. At the same time, through delivery of the low-boiling fuel components, the valve and intake line substantially enhance both ignition and combustion in the auxiliary chamber, especially during the cold-start and warm-up phases of operation.

Since the low-boiling fuel components supplied in addition to the injected fuel are needed essentially only during these special operating phases, the auxiliary intake line may contain a switch valve for switching to an air line that bypasses the adsorption filter and connects the auxiliary chamber directly with the atmosphere. It is possible, in this way, to draw clean air into the auxiliary chamber, for example after a given time has lapsed following the first ignition of the internal combustion engine or when a defined operating condition of the engine has been reached.

In accordance with another embodiment of an internal combustion engine according to the present invention, the fuel delivery device may comprise an auxiliary carburetor, arranged in the auxiliary intake line, for supplying a rich fuel-air mixture. In this case, a branch line is suitably provided to connect the adsorption filter with the auxiliary intake line at a point beyond auxiliary carburetor as seen in the direction of gas flow.

DESCRIPTION OF THE PREFERRED EMBODIMENTS

Figure 1:
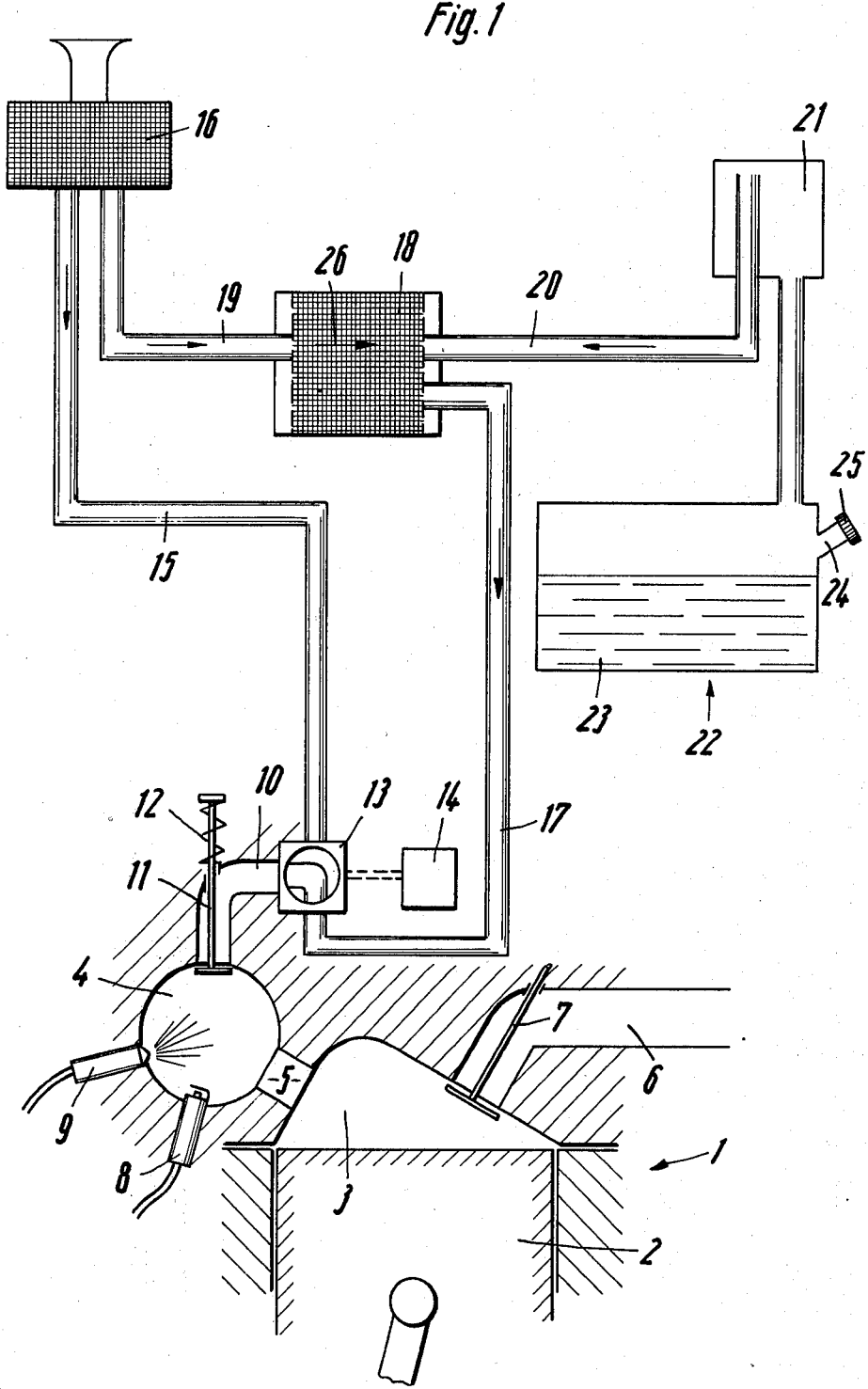
FIG. 1 is a partly schematic and partly cross-sectional view of an internal combustion engine having a fuel-injected auxiliary combustion chamber. An auxiliary intake line connects the auxiliary chamber with a fuel adsorption filter in the fuel system.

The preferred embodiments of the present invention will now be described in connection with FIGS. 1 and 2 of the drawings. Identical elements in these two figures are designated with the same reference numerals.

In FIG. 1, the numeral 1 generally indicates an internal combustion engine of which only the cylinder head region is shown as being of interest. The internal combustion engine 1 is provided with a main combustion chamber 3 arranged above a piston 2 and an auxiliary combustion chamber (prechamber) 4 located to the side of the main combustion chamber 3 and connected therewith by means of a short passage 5. In the embodiment shown, the prechamber 4 is of approximately spherical shape and may comprise from about 10–35% in volume of the entire compression space.

In addition to the connecting passage 5 an intake port 6, to which is connected a not shown mixture formation device, as well as an exhaust port (not shown) open into the main combustion chamber 3. An intake valve 7 controlling the intake port 6 and an exhaust valve (not shown) are actuated by a camshaft which is rotated by the crankshaft of the internal combustion engine.

In the engine embodiment shown in FIG. 1, the prechamber 4 is provided with an ignition device, in the form of a spark plug 8, a fuel injection nozzle 9 and an auxiliary intake line 10 that is opened and closed by a check valve 11 having a return spring 12.

The reference numeral 13 designates a switch valve which can be actuated by a control device 14. The switch valve 13 connects the auxiliary intake line 10 either with an air suction line 15 or with a line 17 leading to an adsorption filter 18. The adsorption filter 18 (which, for example, may comprise activated charcoal as the filter material) is connected on one side by means of an air conduit 19 with the air filter 16 of the engine and, on the other, by way of a conduit 20 associated with a separator 21, with preferably the highest point of a fuel tank 22 containing liquid fuel 23. The tank 22 is provided with filler opening 24 that can be tightly closed off by means of a cap 25.

Figure 2:
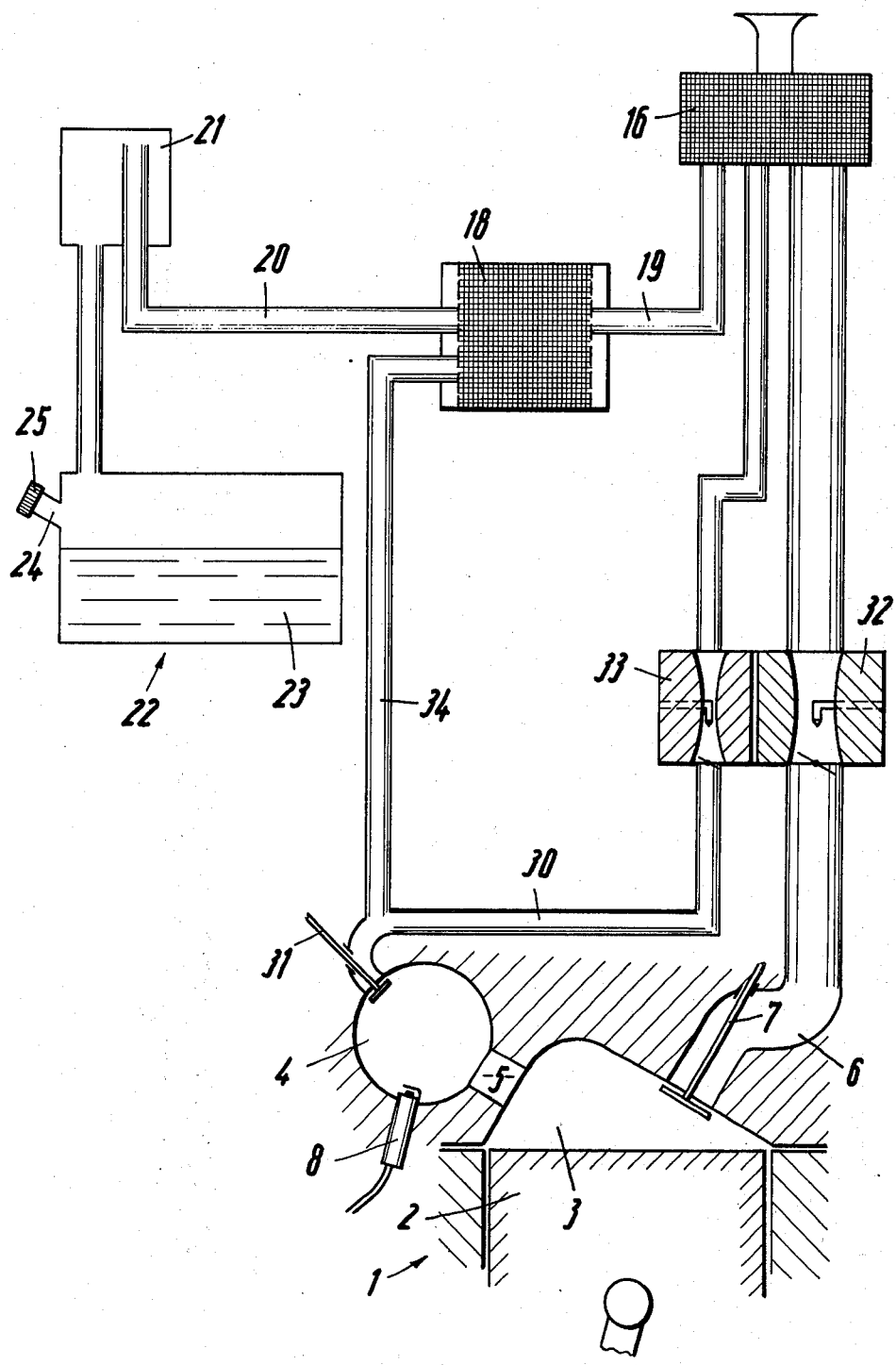
FIG. 2 is a partly schematic and partly cross-sectional view of an internal combustion engine having a carburetor-fueled auxiliary combustion chamber. An intake line connecting an auxiliary carburetor to the auxiliary chamber also receives gases from a fuel adsorption filter in the fuel system.

The embodiment of the internal combustion engine represented in FIG. 2 is quite similar to that of FIG. 1. The essential difference relataive to the embodiment shown in FIG. 1 resides in that, in place of a fuel injection nozzle, an auxiliary intake line 30 controlled by an auxiliary inlet valve 31 delivers a rich fuel-air mixture to the prechamber 4 from an auxiliary carburetor 33. A main carburetor 32 connected to the main intake port 6, on the other hand, supplies a lean fuel-air mixture which varies with the load condition of the engine.

In this embodiment of FIG. 2, the auxiliary intake line 30 is in communication with the adsorption filter 18 by way of a branch line 34 so that when the auxiliary intake valve 31 is open, the low-boiling fuel components generated in the fuel tank 22 and previously adsorbed in the adsorption filter 18 are drawn in also.

The auxiliary intake valve 31 may either be positively controlled, for example by means of a camshaft, or may be a check valve of the type shown in FIG. 1.

The operation of the internal combustion engine in accordance with the invention wil now be described in detail. During the intake stroke of this engine, with the intake valve 7 open, a lean fuel-air mixture or even pure air, depending on the engine load condition, is drawn into the main combustiion chamber 3 through the intake port 6. Admixture of an appropriate quantity of fuel to the air drawn in is facilitated either by means of a carburetor, as is indicated in the embodiment of FIG. 2 by the main carburetor 32, or by the injection of fuel at low pressure into the intake port 6.

During the intake stroke of the internal combustion engine, the auxiliary intake valve, indicated in FIG. 1 by 11 and in FIG. 2 by 31, is open at least part of the time so that a quantity of gas is drawn into the prechamber 4 via the intake line 10 or 30, respectively. In the engine design shown in FIG. 1, this gas quantity essentially serves a scavenging function in the prechamber 4, substantially removing the residual exhaust gas components resulting from the preceding combustion. If the engine is warm, it is sufficient that the intake line 10 be connected with the air intake line 15 leading to the air filter 16 so that clean fresh air will be drawn into the prechamber 4.

Under unfavorable operating conditions — for example, when cold-starting or during the warm-up phase of the internal combustion engine 1 — the auxiliary intake line 10 is connected by way of the line 17 with the adsorption filter 18. The adsorptigon filter 18 is designed to retain by adsorption on filter material (consisting, for example, of activated charcoal) the lowboiling fuel components discharged in the fuel system (most specifically, the fuel tank 22) through evaporation and the like, and in this manner to prevent a discharge of these components into the atmosphere. Towards such end, the adsorption filter 18 is connected by a line 20 and a separator 21 with the highest point of the fuel tank 22 which is closed, gas-tight, by a closing cap 25 on its filler pipe 24. Adsorption filters of this kind have the property that their filter material adsorbs the gaseous fuel components as these components flow through in one direction (in this case, from the line 20 to the line 19) and again desorbs the adsorbed fuel components upon flow-through in the opposite direction (the direction indicated by the arrow 26). The latter directiion of the flow occurs, in the present system, only during the intake stroke when the check valve 11 is open, and when the switch valve 13 is in the position shown in FIG. 1 wherein the intake line 10 is connected with the line 17. In this position, due to the suction pressure in the combustion chamber, air is aspired over the air filter 16, the line 19, the adsorption filter 18, the line 17 and the auxiliary intake line 10 into the prechamber 4. To this air are admixed the lowboiling fuel components previously retained by the adsorption filter 18. In this way, during the cold start and subsequent warm-up phase of the internal combustion engine, the gaseous fuel components which ignite easily and burn even under unfavorable conditions are conducted into the prechamber. As explained above, the combustion of the entire combustable charge is started in the prechamber by means of the spark plug 8 after injection of an adequate quantity of fuel through the injection nozzle 9. Following ignition, there is first combusted,, under air-deficient conditions, the charge share comprised of the comparatively fuel-rich mixture composition contained in the prechamber. A flame front passing through the connecting passage 5 into the main combustion chamber 3 is thus produced which initiates combustion of the lean mixture present there.

After the warm-up phase has terminated — that is, when the internal combustion engine has attained its operating temperature — it becomes unnecessary to draw the low-boiling fuel components from the adsorption filter 18 into the prechamber 4. At this time the switch valve 13 in the auxiliary intake line 10 may be switched by the control device 14 so that the auxiliary intake line 10 is connected with the air line 15. When the switch valve is in this position, only clean air is aspired for scavenging of the prechamber 4, such air being received by way of the air filter 16. The control device 14 actuating the switch valve 13 may comprise, for example, a timing element causing the switch valve 13 to change upon the expiration of a given interval following starting of the engine. In the alternative, it is possible to provide a gauge or sensor — such as a temperature sensor arranged to measure the temperature of the cooling water — which generates a signal for changing the switch valve 3 when a given operating condition is attained.

In the embodiment of the internal combustion engine shown in FIG. 2, an auxiliary carburetor 33 is provided in the auxiliary intake line 30 in place of a fuel injection nozzle aimed directly into the prechamber 4. The carburetor produces a comparatively rich fuel-air mixture which passes by way of the auxiliary intake valve 31 into the prechamber and is there ignited by the spark plug 8. The auxiliary intake valve 31 can be actuated by means of a camshaft in the same manner as the main intake valve 7 in the main intake port 6. However, it may also be designed as a check valve as in the embodiment of FIG. 1. In order to enrich the fuel-air mixture drawn into the prechamber during the intake stroke with the highest possible proportion of low-boiling fuel components, the auxiliary intake line 30 is connected over a branch line 34 with the adsorption filter 18 so that, during the intake stroke, a quantity of air can flow via the air line 19 and branch line 34 through the filter 18 in the desorption direction carrying along the previously adsorbed low-boiling fuel components. Here again, this admixture of low-boiling fuel components renders easier the ignition and combustion of the fuel-air mixture in the prechamber and thereby considerably improves the operating behavior of the internal combustion engine.

It will be understood that the present invention is susceptible to various modifications, changes and adaptations which fall within its spirit and scope. Accordingly, it is intended that the present invention be limited only by the following claims and their equivalents.

I claim:

1. A spark ignited internal combustion engine operated with charge stratification, comprising, in combination:
   a main combustion chamber and an auxiliary combustion chamber, said main and said auxiliary chambers being interconnected by means of a connecting passage;
   a closed fuel system having filter means for adsorbing gaseous components;
   means, connected to said fuel system, for supplying fuel to said main chamber;
   means, connected to said fuel system, for supplying fuel to said auxiliary chamber and providing a combustable fuel-air-mixture in said auxiliary chamber, said fuel-air-mixture being richer than the fuel-air-mixture in said main chamber;
   means for igniting the fuel-air-mixture in said auxiliary chamber; and
   an auxiliary intake line opening into said auxiliary chamber and connected with said filter means such that said filter means operates in the desorption direction as gases are drawn into said auxiliary chamber from said filter means.

2. The internal combustion engine defined in claim 1, further comprising an automatically controlled auxiliary intake valve arranged in said auxiliary intake line.

3. The internal combustion engine defined in claim 2, wherein said auxiliary intake valve is a check valve.

4. The internal combustion engine defined in claim 2, wherein said auxiliary intake valve is mechanically actuated.

5. The internal combustion engine defined in claim 2, wherein said means for supplying fuel to said auxiliary chamber comprises a fuel-injection nozzle opening into said auxiliary chamber,
   whereby said auxiliary intake valve is provided for scavenging, from said auxiliary chamber, the exhaust gas residues produced during combustion.

6.. The internal combustion engine defined in claim 5, wherein said auxiliary intake line includes switch valve means for closing the communicaton with said filter means and opening said auxiliary intake line to the atmosphere.

7. The internal combustion engine defined in claim 1, wherein said means for supplying fuel to said auxiliary chamber includes an auxiliary mixture formation device, connected to said auxiliary intake line, for providing a rich fuel-air mixture,
   whereby gases are supplied to said auxiliary intake line from both said fitler means and said auxiliary mixture formation device.

* * * * *